US008943679B2

(12) United States Patent
Lee et al.

(10) Patent No.: US 8,943,679 B2
(45) Date of Patent: Feb. 3, 2015

(54) DEVICE FOR MANUFACTURING ANTENNA PATTERN FRAME FOR BUILT-IN ANTENNA

(75) Inventors: Dae Kyu Lee, Gyunggi-Do (KR); Jae Suk Sung, Gyunggi-Do (KR); Sung Eun Cho, Gyunggi-do (KR); Dae Seong Jeon, Gyunggi-Do (KR); Dae Ki Lim, Gyunggi-Do (KR); Chan Gwang An, Gyunggi-Do (KR); Ha Ryong Hong, Gyunggi-Do (KR); Nam Il Seo, Seoul (KR)

(73) Assignee: Samsung Electro-Mechanics Co., Ltd., Suwon, Gyunggi-Do (KR)

(*) Notice: Subject to any disclaimer, the term of this patent is extended or adjusted under 35 U.S.C. 154(b) by 229 days.

(21) Appl. No.: 12/650,005

(22) Filed: Dec. 30, 2009

(65) Prior Publication Data
US 2011/0030198 A1 Feb. 10, 2011

(30) Foreign Application Priority Data

Aug. 10, 2009 (KR) ........................ 10-2009-0073356

(51) Int. Cl.
*B23P 19/00* (2006.01)
*H01P 11/00* (2006.01)
*H01Q 1/38* (2006.01)
*H01Q 1/24* (2006.01)

(52) U.S. Cl.
CPC . *H01Q 1/38* (2013.01); *H01Q 1/243* (2013.01)
USPC ............ 29/729; 29/600; 29/601; 343/700 MS

(58) Field of Classification Search
USPC .......... 29/600, 592.1, 830–831; 343/700 MS, 343/702, 829, 846
See application file for complete search history.

(56) References Cited

U.S. PATENT DOCUMENTS

| 6,147,661 | A  | * | 11/2000 | Nakagawa et al. | ............ 343/895 |
| 6,281,842 | B1 | * | 8/2001  | Moren           | ................. 343/700 MS |
| 6,538,604 | B1 | * | 3/2003  | Isohatala et al.| ....... 343/700 MS |
| 6,822,609 | B2 | * | 11/2004 | Mendolia et al. | ...... 343/700 MS |
| 7,193,564 | B2 | * | 3/2007  | Takagi et al.   | .......... 343/700 MS |

(Continued)

FOREIGN PATENT DOCUMENTS

CN 1702909 A 11/2005
EP 1033778 2/2000

(Continued)

OTHER PUBLICATIONS

European Search Report for Application No. 10171020.0 mailed Dec. 12, 2010.

(Continued)

*Primary Examiner* — Minh Trinh
(74) *Attorney, Agent, or Firm* — McDermott Will & Emery LLP

(57) ABSTRACT

A device for manufacturing an antenna pattern frame includes a conveyor for conveying a radiator sheet including antenna radiators successively arranged thereon in a form of cells, the antenna radiators including respective antenna pattern portions for receiving an external signal, a bending mold for successively forming connection terminal portions in the radiator sheet that is being conveyed, by using a bending process, and an injection mold for injection-molding antenna frames such that the antenna pattern portions are placed on one set of respective sides of the radiator frames and the connection terminal portions are placed on another set of respective opposite sides of the radiator frames.

7 Claims, 4 Drawing Sheets

(56) References Cited

U.S. PATENT DOCUMENTS

| | | |
|---|---|---|
| 7,237,316 B2 | 7/2007 | Sakamoto |
| 7,237,318 B2 * | 7/2007 | Annamaa et al. ............... 29/600 |
| 2004/0201431 A1 | 10/2004 | Onishi |
| 2005/0264458 A1 | 12/2005 | Takagi |
| 2009/0015507 A1 | 1/2009 | Hong et al. |
| 2013/0335275 A1 * | 12/2013 | Sanford et al. ............... 343/702 |

FOREIGN PATENT DOCUMENTS

| | | |
|---|---|---|
| EP | 1 221 735 A1 | 7/2002 |
| JP | 57-062635 | 4/1982 |
| JP | 04215412 | 8/1992 |
| JP | 2003078323 | 3/2003 |
| JP | 2004312437 | 11/2004 |
| JP | 2007288297 | 11/2007 |
| JP | 2008140400 | 6/2008 |
| KR | 1020010010572 A | 2/2001 |
| WO | 2004032280 | 4/2004 |
| WO | 2010098540 A2 | 9/2010 |

OTHER PUBLICATIONS

Chinese Office Action issued Mar. 5, 2013 in Application No. 200910215101.X.

Examination Report dated Apr. 12, 2013 issued in European Patent Application No. 12000276.1.

Extended European Search Report for Application No. 12000276.1 mailed Mar. 26, 2012.

Japanese Office Action for Application No. 2010-178908 mailed Jul. 24, 2012.

Japanese Office Action for Application No. JP2010-178908 mailed Dec. 20, 2011.

European Office Action issued in European Application No. 10171020.0 dated Sep. 4, 2014.

* cited by examiner

DEVICE FOR MANUFACTURING ANTENNA PATTERN FRAME FOR BUILT-IN ANTENNA

CROSS-REFERENCE TO RELATED APPLICATIONS

This application claims the priority of Korean Patent Application No. 10-2009-0073356 filed on Aug. 10, 2009, in the Korean Intellectual Property Office, the disclosure of which is incorporated herein by reference.

BACKGROUND OF THE INVENTION

1. Field of the Invention

The present invention relates to a device for manufacturing an antenna pattern frame capable of mass-producing antenna pattern frames in a successive manner, wherein the antenna pattern frames enable antenna patterns to be embedded in electronic device cases.

2. Description of the Related Art

Mobile communications terminals such as cellular phones, personal digital assistants (PDAs) and laptop computers, which support wireless communications, are indispensable devices in modern society. Functions including CDMA, wireless LANs, GSM and DMB have been added to these mobile communications terminals. One of the most important components that enable these functions to operate is associated with antennas.

Antennas being used in these mobile communications terminals have advanced from external antennas, such as rod antennas or helical antennas, to internal antennas that are disposed inside of terminals.

External antennas are susceptible to damage by external shock, while internal antennas increase the volume of terminals.

In order to solve these problems, research has been undertaken to manufacture antennas that are formed integrally with mobile communications terminals.

In order that antennas are formed integrally with terminals, a method of bonding flexible antennas to terminal bodies using adhesives is used. Recently, a method of forming antenna films by molding has been proposed.

However, when flexible antennas are bonded by simply using adhesives, the reliability of these antennas is reduced as the adhesiveness decreases. Besides, this also causes harm to the appearance of the terminals, lessening emotional quality for consumers.

In addition, when antenna films are used, product stability can be ensured. However, a process of bonding an antenna to a film is difficult to perform and manufacturing costs are also increased.

Moreover, when such antenna films undergo a molding process, the elasticity of the antenna films makes it difficult to inject a molding solution into the mold while fixing the antenna films.

Therefore, there is a need for studies to enable electronic device cases having antenna radiators embedded therein to be mass produced in a successive manner.

SUMMARY OF THE INVENTION

According to an aspect of the present invention, there is provided a device for manufacturing an antenna pattern frame, the device including a conveyor for conveying a radiator sheet including antenna radiators successively arranged thereon in a form of cells, the antenna radiators including respective antenna pattern portions for receiving an external signal, a bending mold for successively forming connection terminal portions in the radiator sheet that is being conveyed, by using a bending process, and an injection mold for injection-molding antenna frames such that the antenna pattern portions are placed on one set of respective sides of the radiator frames and the connection terminal portions are placed on another set of respective opposite sides of the radiator frames.

The device may further include: a supply reel supplying the radiator sheet; and a pick-up reel collecting the radiator sheet, wherein the supply reel and the pick-up reel convey the radiator sheet continuously.

Each of the antenna pattern portions may be connected to a support pin of the radiator sheet, and the support pin may include a cutting guide portion disposed in a connection portion of the support pin with the antenna pattern portion, so that the antenna pattern portion is easily separated from the support pin.

The cutting guide portion may be a notch, a relief recess, or both the notch and the relief recess.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
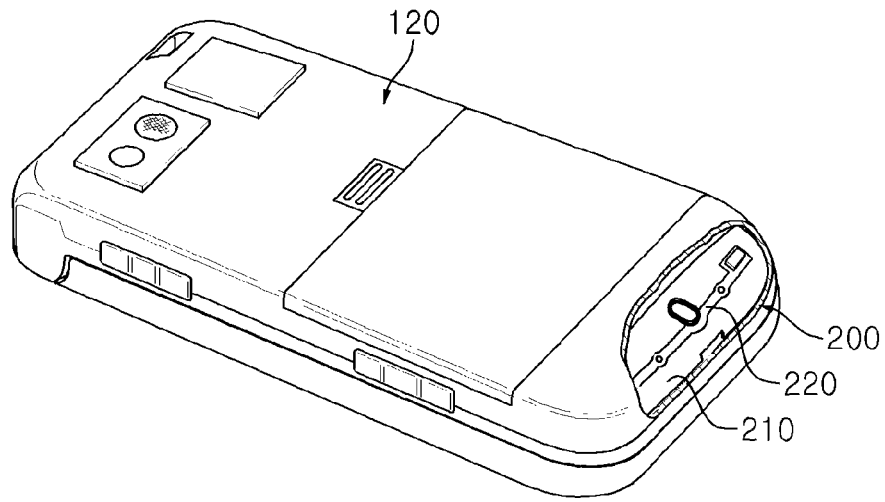
FIG. 1 is a schematic perspective view, with a cut-out portion, illustrating a case for a mobile communications terminal, which is an electronic device case having an antenna radiator embedded therein by using an antenna pattern frame according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. While those skilled in the art could readily devise many other varied embodiments that incorporate the teachings of the present invention through the addition, modification or deletion of elements, such embodiments may fall within the scope of the present invention.

In the drawings, like reference numerals in the drawings denote like elements.

Figure 2:
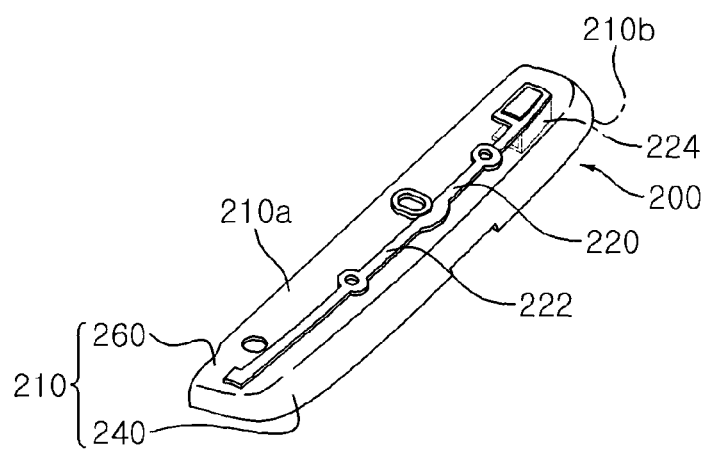
FIG. 2 is a schematic perspective view illustrating an antenna pattern frame according to an exemplary embodiment of the present invention.

FIG. 1 is a schematic perspective view, with a cut-out portion, illustrating a case for a mobile communications terminal, which is an electronic device case having an antenna radiator embedded therein by using an antenna pattern frame according to an exemplary embodiment of the present invention. FIG. 2 is a schematic perspective view illustrating an antenna pattern frame according to an exemplary embodiment of the present invention.

Figure 3:
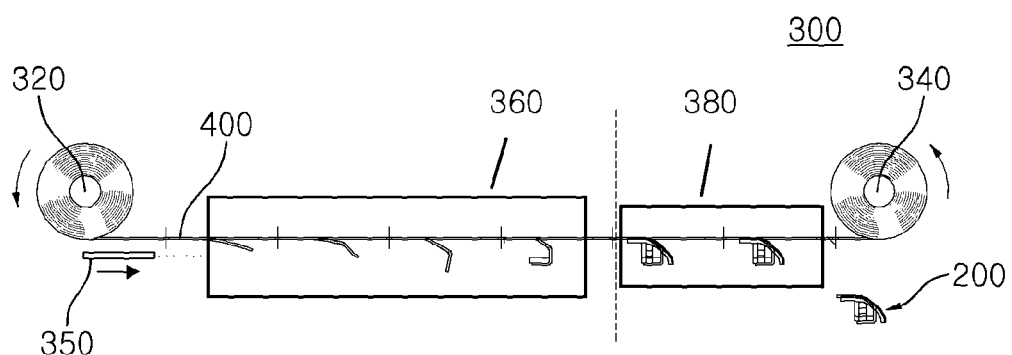
FIG. 3 is a schematic view illustrating a device for manufacturing an antenna pattern frame in a successive manner, according to an exemplary embodiment of the present invention.

Referring to FIGS. 1 through 3, an antenna pattern frame 200, according to an exemplary embodiment of the present invention, is applied to a case 120 for a mobile communications terminal 100, which is an electronic device. The antenna pattern frame 200 is applicable to every electronic device using an antenna, such as a laptop computer as well as the mobile communications terminal 100.

The antenna pattern frame 200 is used so that an antenna radiator 220 is formed at or in the vicinity of the center of the inner section of the case 120 and receives an external signal.

The antenna radiator 220 is formed of a conductive material such as aluminum or copper, and receives an external signal and sends it to a signal processor of the electronic device. The antenna radiator 220 may include an antenna pattern portion 222 for receiving an external signal of various bands.

A connection terminal portion 224 transmits a received external signal to the electronic device, and may be formed by bending, forming or drawing a portion of the antenna radiator 220.

A radiator frame 210 may have a three-dimensional structure having a flat portion 260 and a curved portion 240 having a curvature. The antenna radiator 220 may have flexibility so as to be disposed on the curved portion 240 of the radiator frame 210.

The radiator frame 210 is produced by injection-molding. The antenna pattern portion 222 is disposed on one side 210a of the radiator frame 210, and the connection terminal portion 224 may be disposed on an other side 210b opposite to the one side 210a.

The antenna radiator 220 embedded in the case 120 may include the antenna pattern portion 222 and the connection terminal portion 224 arranged in different planes. Here, the antenna pattern portion 222 receives an external signal, and the connection terminal portion 224 transmits the external signal to the electronic device.

The antenna pattern frame 200 serves as a first injection-molded structure enabling the radiator 220 including the antenna pattern portion 222 to be embedded in the case 120.

Hereinafter, a device for manufacturing the antenna pattern frame 200 in a successive manner is described.

Figure 4:
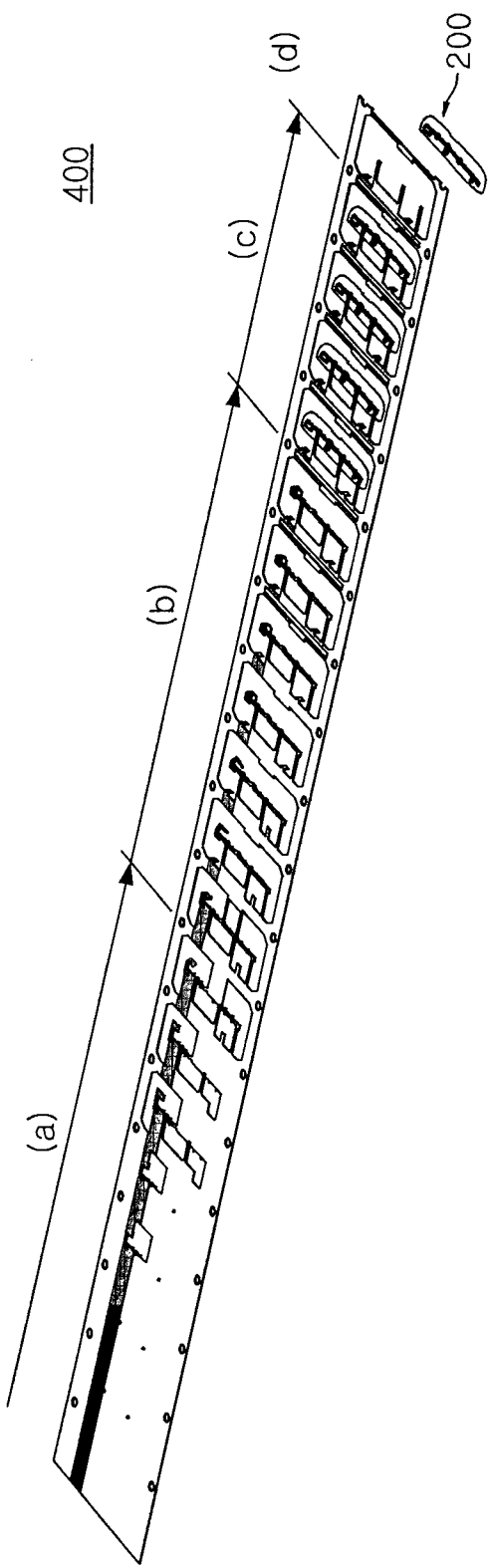
FIG. 4 is a schematic plan view illustrating how antenna radiators including antenna pattern portions are arranged in the form of cells in an elongated radiator sheet by press processing performed by the device for manufacturing an antenna pattern frame depicted in FIG. 3.
Figure 5:
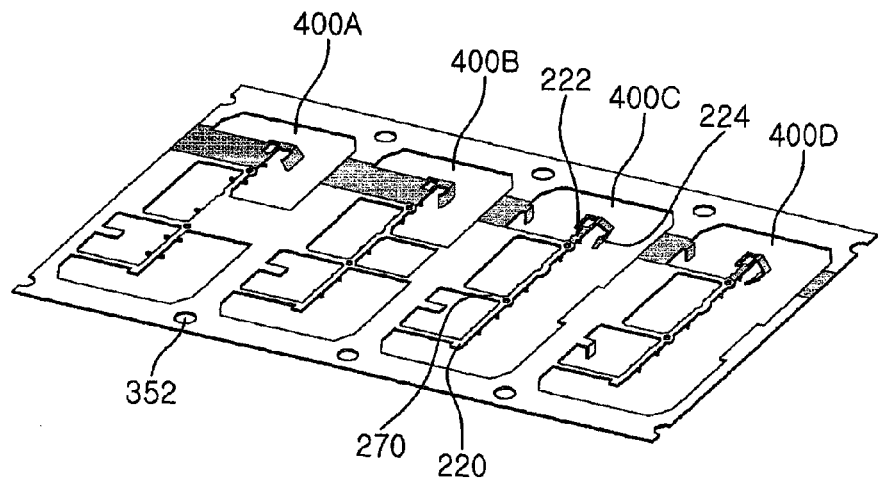
FIG. 5 is a schematic perspective view illustrating the antenna cells cut in radiator-sheet units to be put into a mold for manufacturing successive antenna pattern frames.
Figure 6:
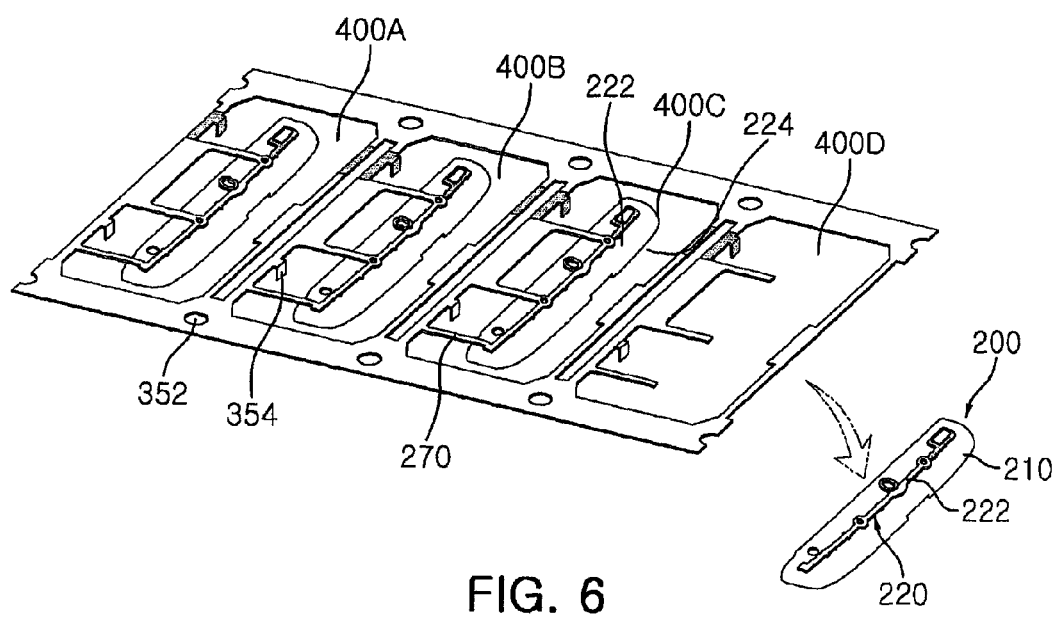
FIG. 6 is a schematic perspective view illustrating successive antenna pattern frames injection-molded by injecting a resin material into the mold for manufacturing antenna pattern frames after putting the radiator-sheet units into the mold.

FIG. 3 is a schematic view illustrating a device for manufacturing an antenna pattern frame in a successive manner, according to an exemplary embodiment of the present invention. FIG. 4 is a schematic plan view illustrating how antenna radiators including antenna pattern portions are arranged in the form of cells (hereinafter, also referred to as 'antenna cells') in an elongated radiator sheet by the press processing performed by the device for manufacturing an antenna pattern frame depicted in FIG. 3. FIG. 5 is a schematic perspective view illustrating the antenna cells cut in predetermined radiator-sheet units to be put into a mold for manufacturing successive antenna pattern frames. FIG. 6 is a schematic perspective view illustrating successive antenna pattern frames injection-molded by injecting a resin material into the mold for manufacturing antenna pattern frames after putting the radiator-sheet units into the mold.

A device 300 for manufacturing an antenna pattern frame according to an exemplary embodiment of the present invention may include a conveyor 350 for conveying a radiator sheet 400, a bending mold 360, and an injection mold 380.

The radiator sheet 400 has antenna radiators 220 respectively including antenna pattern portions 222 receiving an external signal. The antenna radiators 220 are arranged in the form of cells 400A, 400B, 400C, and 400D (i.e., antenna cells). Here, the antenna cells 400A, 400B, 400C, and 400D are arranged successively in the radiator sheet 400.

The antenna cells 400A, 400B, 400C, and 400D in the radiator sheet 400 may each be provided with a support pin 270 as well as the corresponding antenna radiator 220. Here, the support pin 270 serves to support the antenna radiator 220.

In order to provide the antenna radiators 220, the elongated radiator sheet 400 is subjected to press-processing 360 and injection-molding 380 while continuously moving in the device 300 for manufacturing an antenna pattern frame.

The press-processing 360 refers to the process of punching the radiator sheet 400 for the formation of antenna pattern frames as illustrated in a part (a) of FIG. 4, and the process of successively bending portions of the radiator sheet 400 so as to form three-dimensionally curved connection terminal portions 224 from the antenna pattern frames 200 as illustrated in a part (b) of FIG. 4.

The injection molding 380 refers to the process of injecting-molding the antenna pattern frames 200 such that the antenna pattern portion 222 is placed on the one side 210a of each of the antenna pattern frames 200 and the connection terminal portion 224 is placed on the other side 210b thereof as illustrated in a part (c) of FIG. 4.

The molded antenna pattern frames 200 are subjected to an ejection process as illustrated in a part (d) of FIG. 4, and then to the second injection-molding process allowing the antenna radiators 220 to be placed at or in the vicinity of the centers of the respective inner sections of cases 120 for electronic devices.

The device 300 for manufacturing the antenna pattern frame 200 may further include a supply reel 320 supplying the radiator sheet 400 such that the radiator sheet 400 is continuously conveyed, and a pick-up reel 340 collecting the radiator sheet 400.

The conveyor 350 is a conveyor plate for supporting the continuous transfer of the radiator sheet 400. The radiator sheet 400 may include conveyance support holes 352 coupled with the conveyor 350 and enabling the radiator sheet 400 to be stably conveyed.

The radiator sheet 400 has conveyance support pieces 354 to support its conveyance on the conveyor 350. Each conveyance support piece 354 is stably supported on the central portion of the conveyor plate, namely, the conveyor 350.

Figure 7:
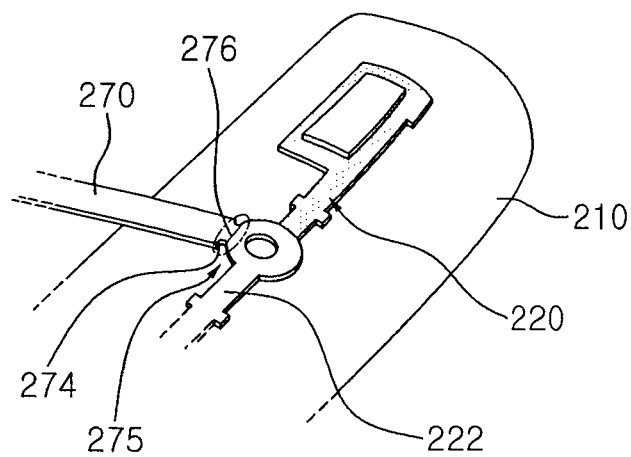
FIG. 7 is a schematic enlarged view illustrating an antenna pattern portion in connection with a support pin.
Figure 8:
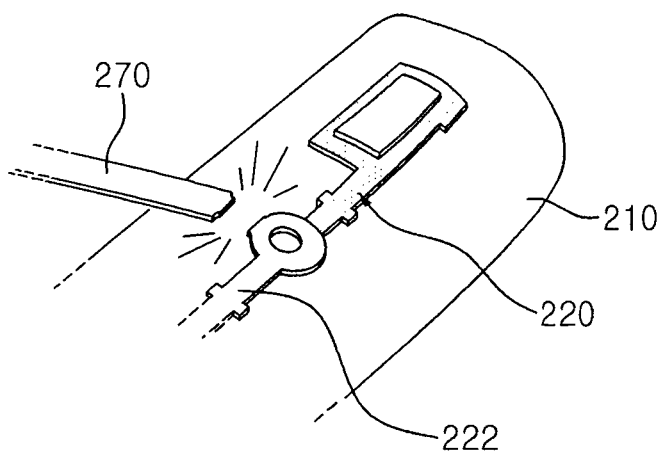
FIG. 8 is a schematic enlarged view illustrating an antenna pattern portion being separated from a support pin.

FIG. 7 is a schematic enlarged view illustrating an antenna pattern portion in connection with a support pin, and FIG. 8 is a schematic enlarged view illustrating an antenna pattern portion being separated from a support pin.

As described above, each of the antenna cells 400A, 400B, 400C, and 400D in the radiator sheet 400 includes the antenna radiator 220 and the support pin 270 supporting the antenna radiator 220.

The support pin 270 supporting the antenna radiator 220 includes a cutting guide portion 275 at a connection portion between the support pin 270 and the antenna pattern portion 222 of the antenna radiator 220. The cutting guide portion 275 facilitates the ejection of the antenna pattern frame 200 including the antenna radiator 220.

The cutting guide portion 275 may include a notch 276, a relief recess 274, or both the notch 276 and the relief recess 274 in order to facilitate the separation between the antenna pattern portion 222 and the support pin 270.

As for a method of manufacturing an antenna pattern frame in a successive manner, one exemplary embodiment is associated with moving a radiator sheet continuously, and another exemplary embodiment is associated with grouping cells of antenna radiators (i.e., antenna cells), including antenna pattern portions, into radiator-sheet units and performing injection-molding by stages.

In detail, as shown in FIG. 4, the one exemplary method of the manufacturing method includes arranging, in the elongated radiator sheet 400, cells of the antenna radiators 220 including the antenna pattern portions 222 receiving external signals.

Subsequently, while the radiator sheet 400 is being conveyed, the connection terminal portions 224 of the antenna radiators 220 are formed successively by using a bending process, and the radiator frames 210 are then injection-molded successively such that antenna pattern portions 222 are placed on one set of sides 210*a* of the respective radiator frames 210 and the connection terminal parts 224 are placed on the other set of sides 210*b* opposite to the sides 210*a*, respectively.

As shown in FIGS. 5 and 6, another exemplary embodiment of the manufacturing method includes grouping the cells of the antenna radiators 220, including the antenna pattern portions 222 receiving external signals, into radiator-sheet units.

The connection terminal portions 224 of the antenna radiators 220 in each radiator-sheet unit are formed by a bending process simultaneously or by stages. Subsequently, each radiator frame 210 is injection-molded such that the antenna pattern portion 222 is placed on one side 210*a* thereof and the connection terminal portion 224 is placed on the other side 210*b* thereof.

As set forth above, according to the method and device for manufacturing antenna pattern frames according to exemplary embodiments of the invention, antenna pattern frames including antenna radiators can be mass-produced through successive processes.

Furthermore, the time it takes to manufacture electronic device cases having antenna radiators embedded therein is shortened, and productivity is enhanced to thereby reduce manufacturing costs and enhance product competitiveness.

While the present invention has been shown and described in connection with the exemplary embodiments, it will be apparent to those skilled in the art that modifications and variations can be made without departing from the spirit and scope of the invention as defined by the appended claims.

What is claimed is:

1. A device for manufacturing an antenna pattern frame for an antenna pattern embedded within a case of an electronic device, the device comprising:
a conveyor for conveying a radiator sheet including antenna radiators successively arranged thereon in a form of cells, the antenna radiators including respective antenna pattern portions for receiving an external signal;
a press-processor for successively forming connection terminal portions to be separated from the radiator sheet in the radiator sheet that is being conveyed, by using a bending process; and
an injection mold for injection-molding radiator frames such that the antenna pattern portions are placed on first sides of the radiator frames, respectively, and the connection terminal portions are placed on opposite, second sides of the radiator frames, respectively, wherein
each antenna pattern portion is to be embedded within the case of the electronic device by injection-molding each radiator frame so as to be embedded within the case of the electronic device.

2. The device of claim 1, further comprising:
a supply reel for supplying the radiator sheet; and
a pick-up reel for collecting the radiator sheet,
wherein the supply reel and the pick-up reel are configured to convey the radiator sheet continuously.

3. The device of claim 1, wherein
each of the antenna pattern portions is connected to a support pin of the radiator sheet, and
each support pin includes a cutting guide portion disposed in a connection portion thereof, so as to separate the antenna pattern portion from the support pin.

4. The device of claim 3, wherein the cutting guide portion is in a form of a notch, a relief recess, or a combination of both.

5. A device for manufacturing an antenna pattern frame, the device comprising:
a conveyor for conveying a radiator sheet including antenna radiators successively arranged thereon in a form of cells, the antenna radiators including respective antenna pattern portions for receiving an external signal;
a press-processor for successively forming connection terminal portions in the radiator sheet that is being conveyed, by using a bending process; and
an injection mold for injection-molding antenna frames such that the antenna pattern portions are placed on one set of respective sides of the radiator frames and the connection terminal portions are placed on another set of respective opposite sides of the radiator frames, wherein
each of the antenna pattern portions is connected to a support pin of the radiator sheet, and
each support pin includes a cutting guide portion disposed in a connection portion thereof, so as to separate the antenna pattern portion from the support pin.

6. The device of claim 5, further comprising:
a supply reel for supplying the radiator sheet; and
a pick-up reel for collecting the radiator sheet, wherein the supply reel and the pick-up reel are configured to convey the radiator sheet continuously.

7. The device of claim 5, wherein the cutting guide portion is in a form of a notch, a relief recess, or a combination of both.

* * * * *